United States Patent
Pore et al.

(10) Patent No.: US 7,693,345 B2
(45) Date of Patent: Apr. 6, 2010

(54) METHOD AND APPARATUS FOR ERROR CONCEALMENT FOR JPEG 2000 COMPRESSED IMAGES AND DATA BLOCK-BASED VIDEO DATA

(75) Inventors: Vinayak Jayaram Pore, Pune (IN); Jaya Shrikrishna Panvalkar, Pune (IN); Pravin Gangadhar Karandikar, Pune (IN); Shantanu Nath, Pune (IN); Parag Chaurasia, Pune (IN)

(73) Assignee: NVIDIA Corporation, Santa Clara, CA (US)

(*) Notice: Subject to any disclaimer, the term of this patent is extended or adjusted under 35 U.S.C. 154(b) by 1029 days.

(21) Appl. No.: 11/067,855

(22) Filed: Feb. 28, 2005

(65) Prior Publication Data

US 2005/0196053 A1 Sep. 8, 2005

Related U.S. Application Data

(60) Provisional application No. 60/550,178, filed on Mar. 4, 2004.

(51) Int. Cl.
  *G06K 9/40* (2006.01)
(52) U.S. Cl. .................. 382/275; 382/232; 382/166
(58) Field of Classification Search ......... 382/232–253, 382/275, 166
See application file for complete search history.

(56) References Cited

U.S. PATENT DOCUMENTS 5,365,604 A * 11/1994 Kwok et al. ............... 382/275
5,526,523 A * 6/1996 Straub et al. ............... 713/100
5,687,275 A * 11/1997 Lane et al. .................. 386/68
6,137,915 A * 10/2000 Chai ........................... 382/240
6,393,061 B1 * 5/2002 Owechko ............... 375/240.29
6,418,242 B1 * 7/2002 Maurer ....................... 382/266
6,526,532 B1   2/2003 Cinkler et al. ............. 714/712
6,983,073 B1 * 1/2006 Weintraub et al. ......... 382/235
7,085,436 B2 * 8/2006 Akhan et al. ............... 382/298
7,359,556 B2 * 4/2008 Weintraub et al. ......... 382/232
2009/0086828 A1 * 4/2009 Huang et al. ........... 375/240.27

FOREIGN PATENT DOCUMENTS

WO    WO 0042774 A1 *  7/2000

OTHER PUBLICATIONS

"Geometric-structure-based error concealment with novel applications in block-based low-bit-rate coding" Wenjun Zeng; Bede Liu; Circuits and Systems for Video Technology, IEEE Transactions on vol. 9, Issue 4, Jun. 1999 pp. 648-665.*

(Continued)

*Primary Examiner*—Bhavesh M Mehta
*Assistant Examiner*—Sean Motsinger
(74) *Attorney, Agent, or Firm*—Zilka-Kotab, PC (57) ABSTRACT

A method for concealing errors in compressed images in the JPEG 2000 format diosclosed. JPEG2000 (ISO/IEC 15444) is the new standard for image compression catering to different needs of various applications. This standard is much more advanced than JPEG and is rich in features. An Error concealment method in JPEG 2000 is provided which mainly deals with estimating the lost regions in a Wavelet Transformed image and works in Wavelet Transform Domain. This results in optimum error concealment and therefore, The method is applied before taking Inverse DWT.

16 Claims, 10 Drawing Sheets

OTHER PUBLICATIONS

Geometric-Structure-Based Error Concealment with Novel Applications in Block-Based Low-Bit-Rate Coding Wenjun Zeng, , and Bede Liu, IEEE Transactions on Circuits and Systems for Video Technology, vol. 9, No. 4, Jun. 1999.*

Shirani, S.; Kossentini, F.; Ward, R.; Image Processing, IEEE Transactions on vol. 9, Issue 7, Jul. 2000 pp. 1292-1299.*

Tsekeridou, "MPEG-2 Error Concealment Based on Block-Matching Principles," IEEE Transactions on Circuits and Systems for Video Technology, vol. 10, No. 4, Jun. 2000, pp. 646-658.

Sun, "Concealment of Damaged Block Transform Coded Images Using Projections onto Convex Sets," IEEE Transactions on Image Processing, vol. 4, No. 4, Apr. 1995, pp. 470-477.

* cited by examiner

METHOD AND APPARATUS FOR ERROR CONCEALMENT FOR JPEG 2000 COMPRESSED IMAGES AND DATA BLOCK-BASED VIDEO DATA

This application is based on U.S. Provisional Application Ser. No. 60/550,178 filed Mar. 4, 2004.

This inention relates to a method for concealing errors in compressed images in the JPEG 2000 format.

BACKGROUND PRIOR ART

Image compression is one of the key compression technologies in today's network centric world. There are various image compression techniques available. Among these techniques, JPEG is the standard technique for compression of still images. However this standard has many limitations. JPEG2000 (ISO/IEC 15444) is the new standard for image compression catering to different needs of various applications. This standard is much more advanced than JPEG and is rich in features.

Brief of JPEG 2000 Coding

Figure 1A:
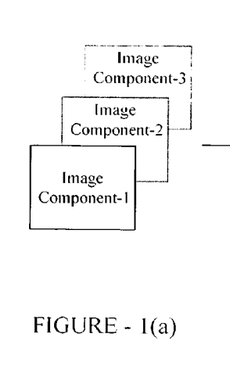
FIG. 1 shows the hierarchy of JPEG 2000 Encoder and explains the basic steps of the JPEG 2000 Encoder. The input to JPEG 2000 is the image comprising the image color components. The input components could be RGB or YUV color components.
Figure 1B:
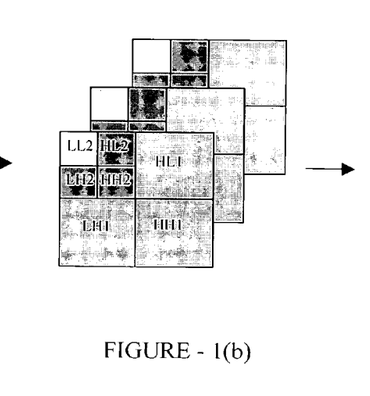
Figure 1C:
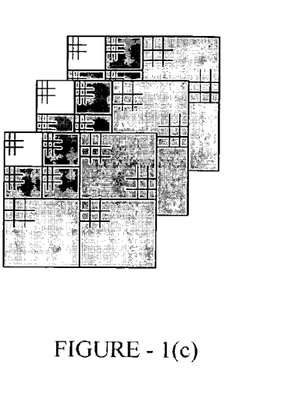

FIG. 1 of the accompanying drawings shows the basic components involved in the JPEG 2000 coding of images.
1. FIG. 1a of the accompanying drawings, shows an image comprising color components. (For example R, G, B or Y, U, V etc).
2. The Discrete Wavelet Transform (DWT) is applied on each of the color components to generate frequency bands and resolution as shown in FIG. 1b. When the DWT is applied only once, LL, HL, LH and HH bands are generated. The DWT can be applied again and again on LL bands. Shown in FIG. 1b of the accompanying drawings is a two level application of DWT. Each of LL, HL, LH and HH are called as sub-bands. These sub-bands together form a resolution.
3. Thus LL2 is resolution level 2, HL2+LH2+HH2 is Resolution level 1 and HL1+LH1+HH1 is resolution level 0 (i.e. original image).
4. The sub-bands are further subdivided in code-blocks (as seen in FIG. 1c). These are the basic building blocks of the JPEG2000 compression scheme. Each sub band is partitioned in the code blocks.
5. The code-block size is flexible.
6. JPEG 2000 stream is composed of coefficients of the code-block coded in efficient manner to give desired bit-rate and compressed visual quality.
7. The code blocks are coded in bit plane fashion starting from most significant bit plane and ending with the least significant.

Figure 2:
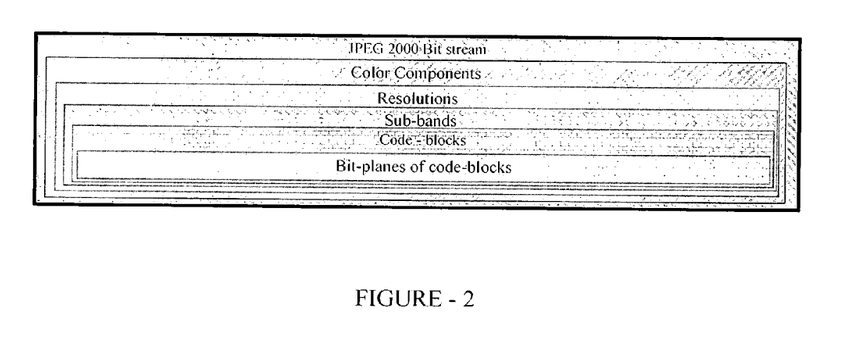
FIG. 2. shows the hierarchy of JPEG 2000 Bitstream and explains the relationship of the various levels of the JPEG 2000 streams. The outer layer acts as a container for the inner layer.

FIG. 2 of the accompanying drawings shows the hierarchy of the JPEG 2000 bit stream from the basic blocks point of view.

The decoding of the JPEG 2000 happens in the sequential order as outlined below in brief.
1. The bit planes of the code block are first decoded.
2. The code-blocks from bands are collected.
3. Once all the code-blocks from the bands of a particular resolution of a particular color component are formed, Inverse Discrete Wavelet Transform (IDWT) can be applied to get resolution of that color component.
4. This is repeated for other sub-bands of other resolutions and color components.
5. Finally the color components are combined together to give the decoded image.

Corruption of the JPEG 2000 Compressed Bit-stream

Figure 3:
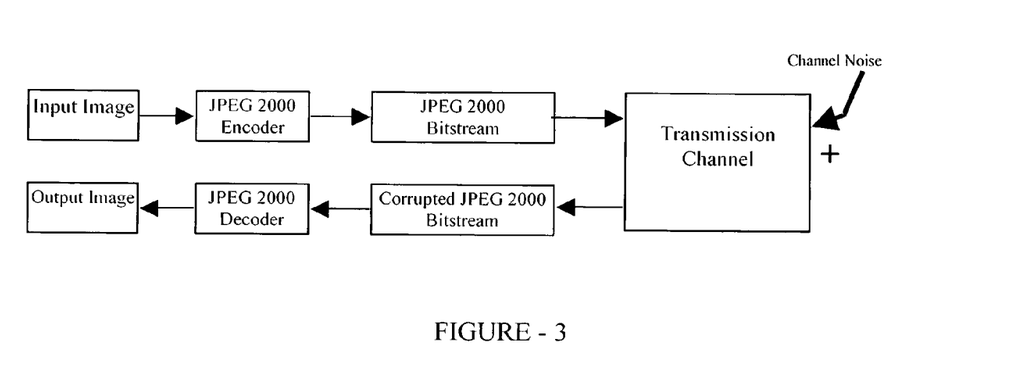
FIG. 3. is a block flow diagram showing the complete Encoding, Decoding and Transmission channel. And explains the full transmission path for JPEG 2000 image.

FIG. 3 of the accompanying drawings shows the block schematics of the image transmission and reception. As it is well known that the wireless channel (or any channel for that matter) is error prone. The additive and multiplicative noises of channel will result in corruption of bits. When such a stream is decoded there could be a loss of picture information.

Effect of Corruption of JPEG 2000 Bit-stream

Channel errors lead to the wrongly decoding of code-blocks. Such code blocks are detected and replaced by zeros to form lost code-blocks.

Figure 4A:
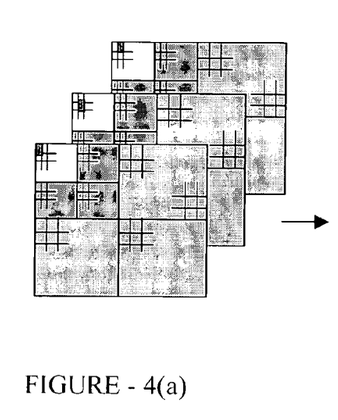
FIG. 4. shows the effect of loss of code-blocks, the loss of code-blocks in the LL sub-bands producing major loss of information when inverse wavelet transformation is applied.
Figure 4B:
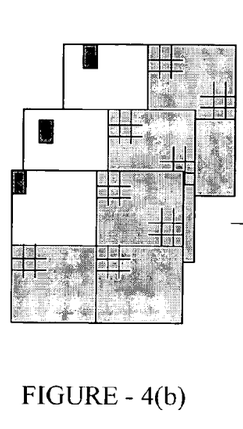
Figure 4C:
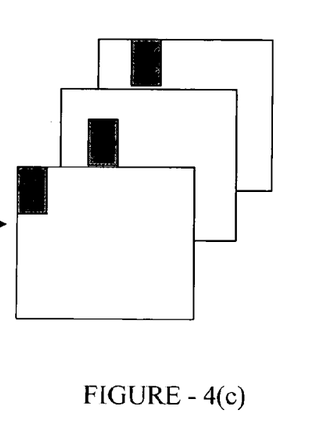

As shown in FIG. 4a of the accompanying drawings, the code blocks from each of the color component in LL3 band is lost. For the sake of illustration the code-block at different locations is considered to be lost. When the IDWT is taken on this resolution the size of the lost code-block grows, this is due to the nature of Inverse Discrete Wavelet Transformation (IDWT). This is shown in FIG. 4b of the accompanying drawings. Another level of IDWT gives back the original image components as shown in FIG. 4c of the accompanying drawings. So it can be seen that a loss of small size code-block at LL3 band leads to the loss of a major area in the reconstructed (decoded) image.

To remove these errors there is a demand for concealment of errors. These errors are detected by known methods of detection. Detection of errors is done using the error resilient features of the JPEG 2000 Bit-stream. This involves resetting of the arithmetic decoder, use of packet header and so on. By means of these techniques the errors are localized to code-blocks or adjacent code-blocks and the location of these lost code-blocks and their sizes of the lost code-blocks are known by these detection methods.

Once the errors are detected various methods have been applied to conceal these errors. Once such method is the Bi-directional Interpolation Algorithm.

This is the simplest technique and is based on interpolation of boundary coefficients in the layer surrounding the lost block. The top-left lost block coefficient is $x_{0,0}$ and the bottom-right lost block coefficient is $x_{M-1,N-1}$. $\lambda=0.5$ is used.

Figure 7:
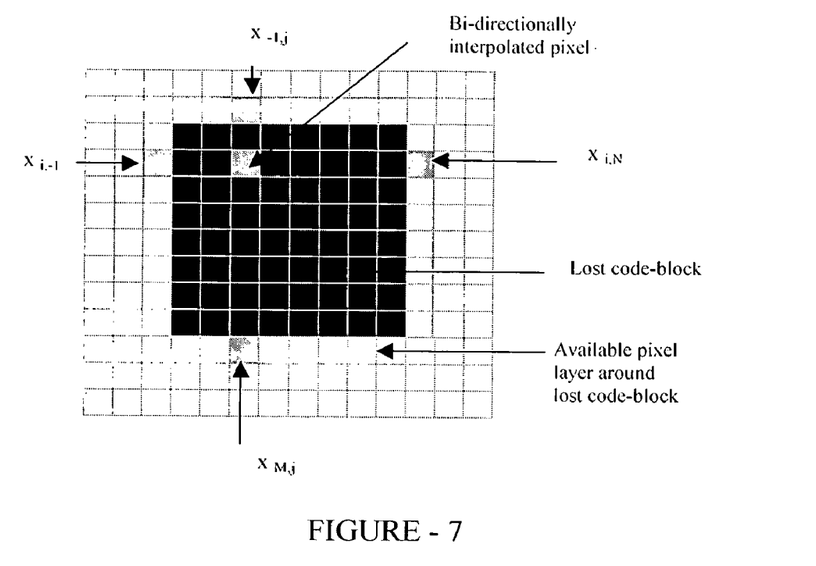
FIG. 7. Concept of Bi-Directional Interpolation (BIA).

FIG. 7 of the accompanying drawings shows how the algorithm works. Only the light gray coefficients surrounding the lost block (in black) are used for concealment of all coefficients within the block. Specifically the coefficient shown in light gray at location $x_{i,j}$ is concealed from the four light gray coefficients with coordinates $x_{i,-1}, x_{i,N}, x_{-1,j}$ and $x_{M,j}$ as described by the equation below.

The equation that describes bi-directional interpolation is $$x_{i,j}=\lambda\{\alpha_j x_{i,-1}+(1-\alpha_j)x_{i,N}\}+(1-\lambda)\{\beta_i x_{-1,j}+(1-\beta_i)x_{M,j}\}$$
$$\text{for } 0\leq i\leq M-1, 0\leq j\leq N-1$$

where
1. M is the height of lost block of coefficients
2. N is the width of lost block of coefficients
3. $\alpha_j=1-(\frac{1}{2}N+j/N)$ and
4. $\beta_i=1-(\frac{1}{2}M+i/M)$ are the distance operators.

In the prior art various methods have been suggested for concealing of these errors. For instance:

U.S. Pat. No. 6,137,915, discloses an Apparatus and method for error concealment for hierarchical sub-band coding and decoding which conceals error in bands of wavelet using other band coefficient at the same location. This operates on band level error concealment and uses the coefficients in the other sub-bands at the same resolution to conceal the corrupted coefficients. However, this method does not use the bit streams properties of JPEG 2000 and therefore does not use the inter-color-component correlation. The scheme in this patent employs a method to conceal error in the lost sub-band of DWT transformed image using other sub-band data. This is therefore a generic scheme and does not work on JPEG 2000 as such. Also this scheme considers the error concealment in the higher sub-bands only.

Again, U.S. Pat. No. 6,526,532, discloses a Channel Error correction apparatus and method" deals with the errors in the sub-bands of DWT. This technique uses cross-band redundancy to conceal the error. First the error is estimated for location and amplitude and then concealed. There are other error concealment techniques, which are however not applied on DWT image but are depended on the information present in the image itself The method of this patent again does not use the inter color component correlation.

Zeng, W., Liu, B., Geometric-Structure-Based Error Concealment with Novel Applications in Block-Based Low-Bit-Rate Coding, IEEE Transactions on Circuits and Systems for Video Technology, Vol. 9, No. 4, June 1999 identifies the geometrical structures in the lost region. This method implements directional interpolation. The edges going in the lost region are identified and interpolated along with the direction of the edges.

Sofia Tsekeridou, Ioannis Pitas, "MPEG 2 Error Concealment Based on Block Matching Principles", IEEE Transactions on Circuits and Systems for Video Technology, Vol. 10, No 4, JUNE 2000. discloses a method which is suitable for MPEG-2 video but some of the specified techniques could be implemented on images as well. This reference talks about Spatial Anisotropic Diffusion (SAD) Error Concealment method. SAD depends on the diffusion of the surrounding image contents in the lost area.

Finally, Sun, H., Kwok, W., "Concealment of Damaged Block Transform Coded Images Using Projections onto Convex Sets", IEEE Transactions of Image Processing, Vol. 4, No. 4, April 1995. uses spatial interpolation algorithm. The neighboring blocks are used to classify the lost block as monotone area or edge area and incase of edge area an angle for the edge is also computed. Based on this the lost block is connected for smoothness, edge etc.

None of these cited references use the inter color component correlation of JPEG 2000. The advantages of using this correlation is as follows:

1. Information present in the sub-band of the other color component can be used to conceal the error. In case of RGB image there is strong correlation in the color components.
2. As wavelet transformed image splits the details present in the image in various resolution and subbands, the error concealment from the same color component but different resolutions and subbands may not give effective concealment.
3. In JPEG 2000, each of the color component is coded independently so chances of corruption of the codeblock at the same location in different color component is somewhat lowered.

An object of this invention is to provide Error concealment in JPEG 2000 which mainly deals with estimating the lost regions in a Wavelet Transformed image and works in Wavelet Transform Domain. This will results in the optimum error concealment and therefore, the method is applied before taking Inverse DWT.

One object of the method of this invention is that it operates on corresponding to the lost block region at the lowest resolution level in wavelet transform domain.

Another object of this invention is that it makes use of coefficients from other color components.

Yet another object of this invention is that it preserves all information from the JPEG 2000 compressed stream.

Still another object of the invention is that, the method is applied only over the lost coefficients in LL subband representing the lowest resolution level. So the information available in all other subbands is preserved. Error Concealment after Inverse DWT would have resulted in loss of this information at regions in reconstructed image.

Another object of this invention is to apply the method of the invention only over the lost coefficients in LL sub-band representing the lowest resolution level. The dimensions of LL sub-band representing the lowest resolution level are smaller than the dimensions of reconstructed image, and therefore another object achieved in accordance with this invention is that computations to be performed are reduced drastically.

Still another object of this invention is to perform concealment only for the blocks lost in LL sub-band representing the lowest resolution level and ignoring other lost blocks taking into account the fact that this sub-band is much more important as compared to any other sub-band.

Another object of this invention is to perform error concealment in one sub band in manner such that information available in all other sub-bands is preserved.

A final object of this invention is to provide a complete error concealment scheme, which selects an appropriate approach for concealing each lost code block, based on the values of coefficients in the neighborhood of the code block under consideration, size of the block (number of coefficients) lost and/or coefficient values in the corresponding region in other sub-bands.

To meet with the aforesaid object there is provided in accordance with this invention, a method and apparatus which takes care of the principle that image compression leads to removal of the redundancies in the image in order to represent the image more compactly resulting in lesser memory disk space and at the same time error concealment needs some redundancy in order to conceal the errors.

This invention also provides a method and apparatus which uses the inter color component redundancy in JPEG 2000.

STATEMENT OF INVENTION

According to this invention there is provided a method for concealing errors in compressed images in the JPEG 2000 format, the images being in the form of code blocks (CBs), each CB being defined by pixels having assigned values, some of the pixels forming an outermost boundary in the CBs, the rest being inner pixels in the CB. A CB is positioned at x-y coordinates, in any of the low-high (L-H), high-low (H-L), low-low (L-L), high-high (H-H) bands, in a resolution and is from a color component. The said method consisting of the following steps:

1. Receiving the image;
2. Parsing the received image to decode the image to a wavelet transformed domain in the form of CBs;
3. Determining the color components of the CBs to be either in RGB color space or the YUV color space;
4. Identifying all the lost CBs;
5. Locating the lost CBs in the L-H, H-L and H-H bands;
6. Setting the values of the pixels of the lost CBs located in the earlier step to zero;
7. Flagging these CBs in which the values have been set to zero;
8. Locating all the lost CBs in the L-L band;
9. Listing the CBs lost in the L-L band in a sequence;
10. Selecting the first lost CB in the sequence;

11. Identifying whether the color component of the said selected lost CB is in the RGB color space;
If the lost CB is in the RGB color space then;
  i. Identifying the component of the selected lost CBs to be either in the R, G or B component;
  ii. Determining whether the CBs at the same location of the remaining 2 color components other than the color component of the selected lost CBs have been correctly decoded, if not then performing error concealment using conventional bidirectional interpolation and iterating the steps for the next lost CB in the listed sequence;
  iii. In case any of the CBs in the same location in the remaining 2 color components are correctly decoded then selecting one correctly decoded CB according to the following rules:
    a. If the selected lost CB upon which this method is being applied has a R component then selecting the correctly decoded CB in the same location having a G component failing which selecting the CB having the B component;
    b. If the selected lost CB upon which this method is being applied has a G component then selecting the correctly decoded CB in the same location having a B component failing which selecting the CB having the R component;
    c. If the selected lost CB upon which this method is being applied has a B component then selecting the correctly decoded CB in the same location having G component failing which selecting the CB having the R component;
  iv. Marking the selected CB as the $1^{st}$ fagged selected CB;
  v. Determining the values of the pixels at the outermost boundaries of the $1^{st}$ flagged selected CB;
  vi. Reassigning the values of the pixels of the outermost boundary of the selected lost CB from the values of pixels from the outermost boundary of the $1^{st}$ flagged selected CB using linear transformation;
  vii. Calculating the percentage of discontinuity between the reassigned values of the pixels in the outermost boundary of the selected lost CB and the values of the pixels in the outermost boundary of correctly decoded adjacent CBs which share a common boundary with the lost CBs and assigning these percentage discontinuity a value $\alpha_{dp1}$;
  viii. Extracting the width and height of the selected lost CB and determining the size $N_{c1}$ by the formula: $N_{c1}$=(width*height) of the selected lost CB in square pixels;
  ix. Using bi-directional interpolation for concealment if the following conditions are satisfied:
    a. If ($\alpha_{dp1}$>500 AND $N_{c1} \leq 256$)
    b. If ($\alpha_{dP1}$>1500 AND $N_{c1}$>256)
    c. And iterating the steps for the next lost CB in the listed sequence;
  x. Determining whether ($125<\alpha_{dp1} \leq 499$) in which case reassigning the values of the inner pixels in the selected lost CB using values of inner pixels of the $1^{st}$ flagged selected CB by a process of linear transformation and performing at least one smoothening operation on the reassigned values of the same inner pixels using the method of averaging of the values of the reassigned values of inner pixels and bi-directional interpolation and if the value of ($N_{c1}$>1024) performing a second smoothening operation using a method of median filtering; And iterating the steps for the next lost CB in the listed sequence;
  xi. In the event ($90 \leq \alpha_{dp1} \leq 125$) reassigning the values of the inner pixels in the selected lost CB using the values of inner pixels of the $1^{st}$ flagged selected CB by a process of Linear Transformation and determining the mean ($m_1$) of the values of the inner pixels in correctly decoded CBs at the same location but in the H-H, L-H and L-H bands in the same color component of the selected lost CB and determining the mean ($m_2$) of correctly decoded CBs at the same location but in the H-H, L-H and H-L bands in the same color component of the $1^{st}$ flagged selected CB;
  xii. In case ($|m_1-m_2| \geq 1$) then performing at least one smoothening operation on the said reassigned values of the inner pixels of selected lost CB using the method of averaging of the values of the reassigned values of inner pixels and Bi-directional Interpolation and if the value of ($N_{c1}$>1024) performing a second smoothening operation using a method of median filtering and iterating the aforesaid steps for the next lost CB in the listed sequence;
  xiii. In case ($\alpha_{dp1}$<90) reassigning the values of the inner pixels in the selected lost CB using values of inner pixels of the $1^{st}$ flagged selected CB by a process of linear transformation and determining the mean ($m_3$) of the values of the inner pixels in the correctly decoded CBs at the same location but in the H-H, L-H and L-H bands in the same color component of the lost CB and determining the mean ($m_4$) of the correctly decoded CB at the same location but in the H-H, L-H and H-L bands in the same color component of the $1^{st}$ flagged selected CB;
  xiv. In case ($|m_3-m_4| \geq 3$) then performing at least one smoothening operation on the reassigned values of the inner pixels using the method of averaging of the values of the reassigned values of inner pixels and bi-directional interpolation and if the value of ($N_{c1}$>1024) performing a second smoothening operation using a method of median filtering and iterating the steps for the next lost CB in the listed sequence; And iterating the steps for the next lost CB in the listed sequence;
In the event that the lost CBs is in the YUV color space;
  i. Identifying whether the color component of the selected lost CB is having the Y, U or V color component;
  ii. Determining whether the CBs at the same location in the remaining 2 components other than the color component of the selected lost CBs have been correctly decoded, if not then performing error concealment on the selected lost CBs using conventional bi-directional interpolation and iterating the steps for the next lost CB in the listed sequence;
  iii. In case any of the CBs in the same location in the remaining 2 color components are correctly decoded then selecting one correctly decoded block according to the following rule:
    a. If the selected lost CB upon which this method is being applied has a Y component then selecting the CB having the U component failing which selecting the CB having the V component;

b. If the selected lost CB upon which this method is being applied has a U component then selecting the CB having the Y component;

C. If the selected lost CB upon which this method is being applied has a V component then selecting the CB having the Y component;

iv. Marking the CB in the selected component as $2^{nd}$ flagged selected CB;

v. Checking whether the selected lost CB in the YUV space is having a Y component or having the U or V component;

vi. In case the selected lost CB has a Y component then calculating $N_{c2}$ in the following manner $N_{c2}$=(width*height) of the selected lost CB in square pixels;

a. if ($N_{c2}$>1024) then reassigning the value of the inner pixels in the selected lost CB using values of the inner pixels in the 2nd flagged selected CB and a process of linear transformation and then performing one smoothening operation on the reassigned values of the inner pixels using the method of averaging of the values of the reassigned values of the inner pixels and bi-directional interpolation and performing a second smoothening operation using a method of median filtering and iterating the steps for the next lost CB in the YUV space in the listed sequence;

b. If ($N_{c2}$≦1024) then reassign the values of the pixels of the outermost boundary of the selected lost CB from the values of pixels from the outermost boundary of the $2^{nd}$ flagged selected CB using linear transformation;

c. Calculating the percentage of discontinuity between the reassigned values of the pixels in the outermost boundary of the selected lost CB and the values of the pixels in the outermost boundaries of the correctly decoded adjacent CBs which share a common boundary with the selected lost CB and assigning the percentage discontinuity a value $\alpha_{dp2}$;

d. Using bi-directional interpolation for concealment if the following conditions are satisfied:
If ($N_{c2}$>256 AND $\alpha_{dp2}$>100) OR
If ($N_{c2}$≦256 AND $\alpha_{dp2}$>50)
Then iterating the steps for the next selected lost CBs in the listed sequence;

e. If the aforesaid condition is not satisfied then performing bi-directional interpolation on the reassigned values of pixels in the outermost boundaries of the selected lost CB;

f. Reassigning the values of the inner pixels of the selected lost CB using values of the inner pixels of the second flagged selected CB and a process of linear transformation;

g. Calculating the percentage of discontinuity between the reassigned values of the pixels in the outermost boundary of the lost CB and the values of the pixels in the outermost boundaries of the correctly decoded adjacent CBs which share a common boundary with selected lost CB and assigning the percentage discontinuity a value $\alpha_{dp3}$;

h. In event ($|\alpha_{dp2}-\alpha_{dp3}|$≦20) then performing a smoothening operation on the reassigned values of each of the inner pixels using the method of averaging of the values of the reassigned values of the inner pixels and bidirectional interpolation. In case ($N_{c2}$>256) performing a second smoothening operation using a method of median filtering and iterating the steps for the next selected lost CB in the listed sequence;

vii. In case the selected lost CB is having the U component or V component then reassign the values of the pixels of the outermost boundary of the selected lost CB using the values of pixels from a outermost boundary of the $2^{nd}$ flagged selected CB using linear transformation;

a. Calculating the percentage of discontinuity between the reassigned values of the pixels in the outermost boundary of the selected lost CB and the values of the pixels in the outermost boundaries of the correctly decoded adjacent CB which share a common boundary with the selected lost CB and assigning this percentage discontinuity a value $\alpha_{dp4}$;

b. Using bi-directional interpolation for concealment if the following condition is satisfied:
If ($\alpha_{dp4}$>60) Then iterating this step for the next lost CBs in the listed sequence;

c. If ($\alpha_{dp4}$≦60) performing bi-directional interpolation on the reassigned values of pixels in the outermost boundaries of the selected lost CB;

d. Reassigning the values of the inner pixels of the selected lost CB using values of inner pixels of the second flagged selected CB and a process of linear transformation;

e. Calculating the percentage of discontinuity between the reassigned values of the pixels in the outermost boundary of the selected lost CB and the values of the pixels in the outermost boundaries of the correctly decoded adjacent CB which share a common boundary with the selected lost CB and assigning the percentage discontinuity a value $\alpha_{dp5}$;

f. In the event ($|\alpha_{dp4}-\alpha_{dp5}|$≦20) then performing a smoothening operation in the reassigned value of the inner pixels using the method of averaging of the values of the reassigned values of the inner pixels and bi-directional interpolation;

In case ($N_{c2}$>1024) performing second smoothening operation using method of median filtering and iterating the steps for the next selected lost CB in the listed sequence.

In accordance with a preferred embodiment of this invention the step of linear transformation is performed as follows:

a. Extracting the values $V_j$ of individual pixels either on the boundary or inside the flagged selected CBs;

b. Determining value $V_i$ of the individual pixels in the selected lost CB in accordance with following rule $V_i=a,V_j+b$ Where constants a, b are derived by determining the relationship between the values of pixels in all the correctly decoded [not lost] CB in the L-L band of the color component of the selected lost CB and the values of pixels at the corresponding location in the L-L band of the color component of the flagged selected CB and then by averaging over number of pixels used in the calculations.

In accordance with another preferred embodiment of this invention the percentage of discontinuity is calculated by the following method:

a. Determining the value $V_a$ of each of pixels in the boundary of each of the CB adjacent to the lost CB;

b. Determining the value $V_b$ of the each of the pixels adjacent to the boundary pixels and within the said adjacent CBs;

c. For each reassigned value of pixels [$V_i$] on each of the boundary pixels on the selected lost CB, calculating the absolute difference between $|V_a-V_i|$ and $|V_a-V_b|$ and determining the discontinuity percentage as $$\frac{\sum_{\text{for all available boundary pixels}} |V_a - V_b| - \sum_{\text{for all available boundary pixels}} |V_a - V_i|}{\sum_{\text{for all available boundary pixels}} |V_a - V_b|} * 100$$

d. If none of the boundary pixels '$V_a$' are available then discontinuity percentage is set to 2000.

BRIEF DESCRIPTION OF FIGURES

The invention will now be described with reference to he accompanying drawings, in which

The error detection and error concealment is incorporated in the JPEG 2000 Decoder.

FIGS. 12(*a*), 12(*b*) and 12(*c*) show some of the results of the invention after applying the concealment method.

FIGS. 13(*a*), 13(*b*) and 13(*c*) show some of the results of the invention after applying the concealment method.

FIGS. 14(*a*), 14(*b*) and 14(*c*) show some of the results of the invention after applying the concealment method.

DETAILED DESCRIPTION OF FIGURES

FIG. 1. depicts the hierarchy of JPEG 2000 Encoder. This figure explains the basic steps of the JPEG 2000 Encoder.

JPEG 2000 works on the image components as shown in FIG. 1*a*. The image could be in RGB color space or in other color transformed space e.g. YUV color space. These color components are transformed using Discrete Wavelet Transform (DWT). The DWT forms high and low frequency regions on each of the horizontal and vertical axis. So one level of DWT would form four sub-bands in the frequency domain. These sub-bands are named as LL (Low Pass component—X Direction, Low pass component—Y Direction), HL (High Pass component—X Direction, Low pass component—Y Direction), LH (Low Pass component—X Direction, High pass component—Y Direction) and HH (High Pass component—X Direction, High pass component—Y Direction).

After one level of application of DWT, LL1, HL1, LH1, HH1 sub-bands are formed. The HL1, LH1, HH1 sub-bands are grouped and called as resolution 0. Another level of DWT on LL1 band further decomposes the LL1 band into four sub-bands. They are LL2, HL2, LH2, HH2. The HL2, LH2, HH2 sub-bands are grouped and called as resolution 1. Where as LL2 is called resolution 2 (lowest resolution this case). Further level of decomposing of LL2 can be possible. This as shown in FIG. 1*b*. The sub-bands of 'DWTed' color components are further divided into code-blocks as depicted in FIG. 1*c*. The code-blocks are of rectangular size. The size of the code-blocks is flexible. The code-blocks are the basic coding units for the JPEG 2000 standard.

FIG. 2. depicts the hierarchy of JPEG 2000 Compressed bit stream. There are various levels for JPEG 2000 compressed bit stream. The outer layer acts as a container for the inner layer. The outermost layer of the streams is components. The DWT is applied to components and the resolutions of the components are form. Each resolution has three sub-bands except lowest resolution, which has only one sub-band. The sub-bands are further partitioned in the rectangular blocks and called as code-blocks. The code-blocks are coded in bit-plane fashion. The coding of the bit planes starts from most significant bit plane to least significant bit plane.

FIG. 3. depicts the complete Encoding, Decoding and Transmission channel i.e. the complete transmission path for JPEG 2000 images. Input image is coded using JPEG 2000 encoder to form JPEG 2000 bit stream. This steams is transmitted though a channel. This transmission channel is usually noisy channel. The channel noise is added to the encoded bit steams and this corruption takes place. Such corrupted bit stream is passed through JPEG 2000 decoder and this results in corrupted decoded image.

FIG. 4. depicts the effect of Loss of Code-block. Decoding of the JPEG 2000 stream is a sequential process at code-block level. If the bit stream is corrupted then the entire code block may not be recovered. The figure shows the loss of code-block due to transmission error. For the sake of illustration the code blocks from each of the color component from LL2 band is shown as corrupted (Black rectangles). After one level of Inverse Discrete Wavelet Transform (IDWT), the area of code-block in LL1 sub-band increases. After another level of IDWT the original color components are retrieved. After each IDWT application, the lost region is doubled. So a code-block originally small in size in LL2 sub-bands gives rise to a large lost region in original resolution when subjected to IDWT, depending upon the number of times IDWT is applied.

Figure 5:
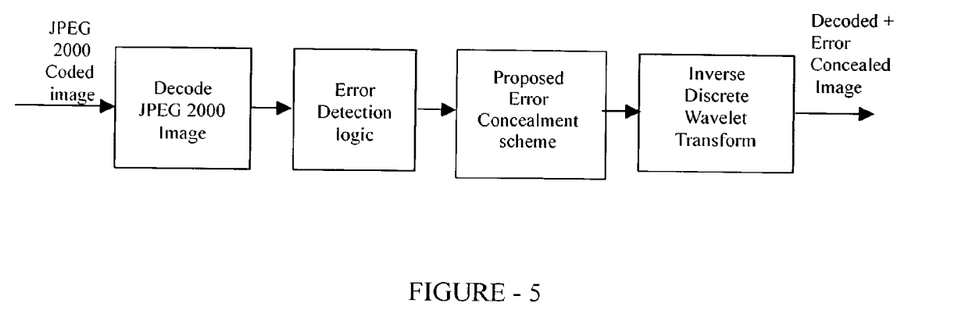
FIG. 5 shows the error Detection and Concealment as applied to JPEG 2000 compressed images.

FIG. 5. depicts the Error Detection and Concealment as applied to JPEG 2000 compressed images. As stated in FIG. 4, channel error results in the corruption of the bit stream. So an Error detection and concealment technique is employed in the JPEG 2000 Decoder itself. While decoding JPEG 2000 image, the lost code-blocks could be identified and the coordinates and sizes of such lost code-blocks are maintained. The identification of the lost code-blocks is outside the scope of the proposed error concealment method. Once the lost code-blocks are identified, the error concealment takes place on the lost code-block. The error concealment takes place on the 'DWTed' data. After error concealment is done the color components are inverse transformed using IDWT.

Figure 6:
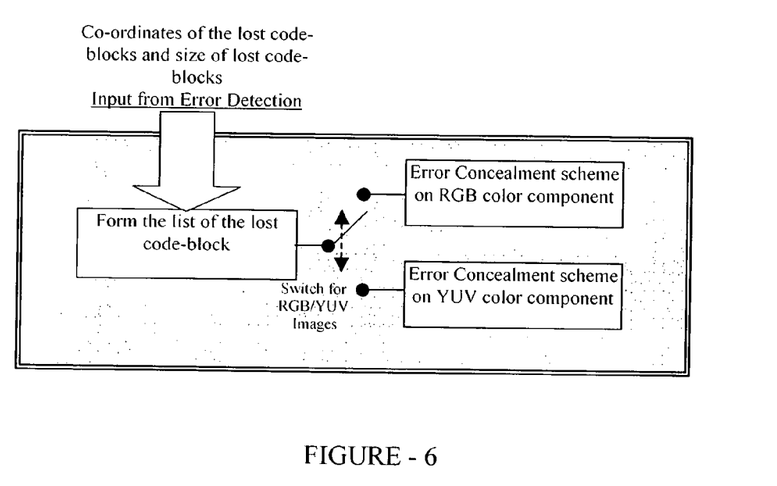
FIG. 6. A bird's eye view for error concealment methodology in accordance with this invention This figure depicts the location of the error concealment with respect to JPEG 2000 Decoder.

FIG. 6. is a bird's eye view for error concealment method in accordance with this invention The coordinates and sizes of the lost code-blocks act as input to error concealment logic. The list of lost code-blocks is formed. Then the based on the color space used for image the scheme for concealment in RGB domain or YUV domain is invoked.

FIG. 7 depicts the concept of Bi-Directional Interpolation (BIA) as applied in this invention. This algorithm is widely used for concealing errors. This is weighted interpolation algorithm applied in both, horizontal and vertical directions. As shown in figure the layer around lost region is used for concealing lost blocks depicted by black squares. The weights are proportional to the distance of the pixels (black squares) from the available layer pixel (gray squares).

Figure 8:
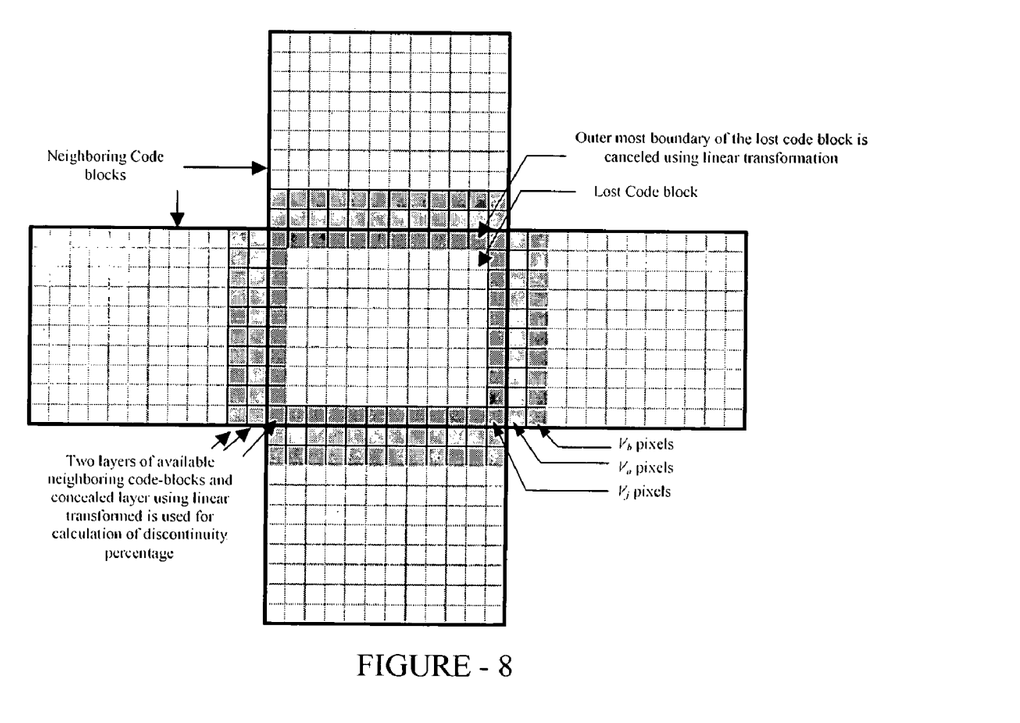
FIG. 8. Calculation of percentage of discontinuity in accordance with this invention. This figure explains the pixel values used for calculation of discontinuity percentage.

FIG. 8. depicts the method of calculation of discontinuity percentage as applied in this invention. The figure shows the lost code-block and surrounding available code-blocks. The outer most layer of the lost code-block is concealed using linear transformation from the selected flagged code-block from the other color component. First the sum of absolute difference of the pixel values in the two outer most layers of four neighboring code-blocks are taken. This is the difference between $V_a$ and $V_b$ pixels values. Let this sum be termed as $S_{available}$. Then sum of absolute difference between $V_j$ and $V_a$ pixel values are taken. Let the sum be denoted by $S_{lost}$. Then $((S_{available}-S_{lost})*100/S_{available})$ gives the percentage of discontinuity.

Figure 9:
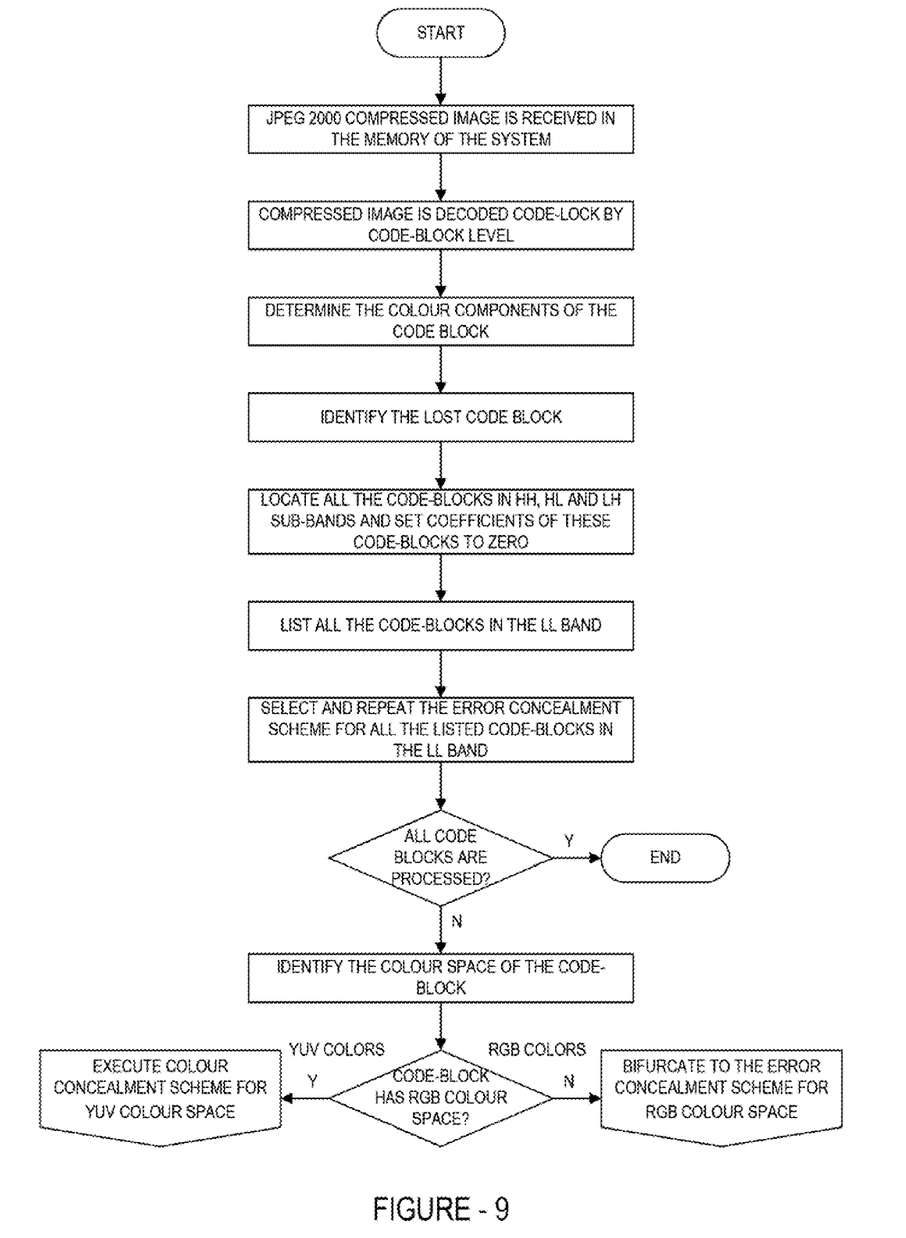
FIG. 9. Flow Chart for concealing code-block in accordance with this invention This figure explains the initial steps for concealing the code block FIG. 10. Flow Chart for concealing code-block from RGB image in accordance with this invention This figure explains the flow chart in details for RGB image.

FIG. 9 is a flow Chart for Initial Steps in concealment of the code block. This figure explains the initial steps in the error concealment algorithm. Start the processing for Error Concealment [9-1]. First JPEG 2000 compressed image is received in the memory of the system [9-2]. Then this compressed image is decoded code-lock by code-block level [9-3]. The decoded image would be in the Discrete Wavelet Transform domain. Determine the colour components of the code block [9-4]. Next step is to identify the lost code block [9-5]. Note that this step is external to the proposed method. Then locate all the code-blocks in HH, HL and LH sub-bands and set coefficients of these code-blocks to zero[9-6]. These code-blocks are not used further in the error concealment procedure [9-7]. Then list all the code-blocks in the LL band [9-8]. Select and repeat the error concealment scheme for all the listed code-blocks in the LL band [9-9]. Decide if all code blocks are processed. If yes then this is the end of the algorithm else proceed with next code block [9-10]. Identify the colour space of the code-block [9-11]. Decide based on the colour space [9-12]. If this code-block has RGB colour space then bifurcate to the error concealment scheme for RGB colour space [9-13] otherwise execute colour concealment scheme for YUV colour space [9-14].

Figure 10:
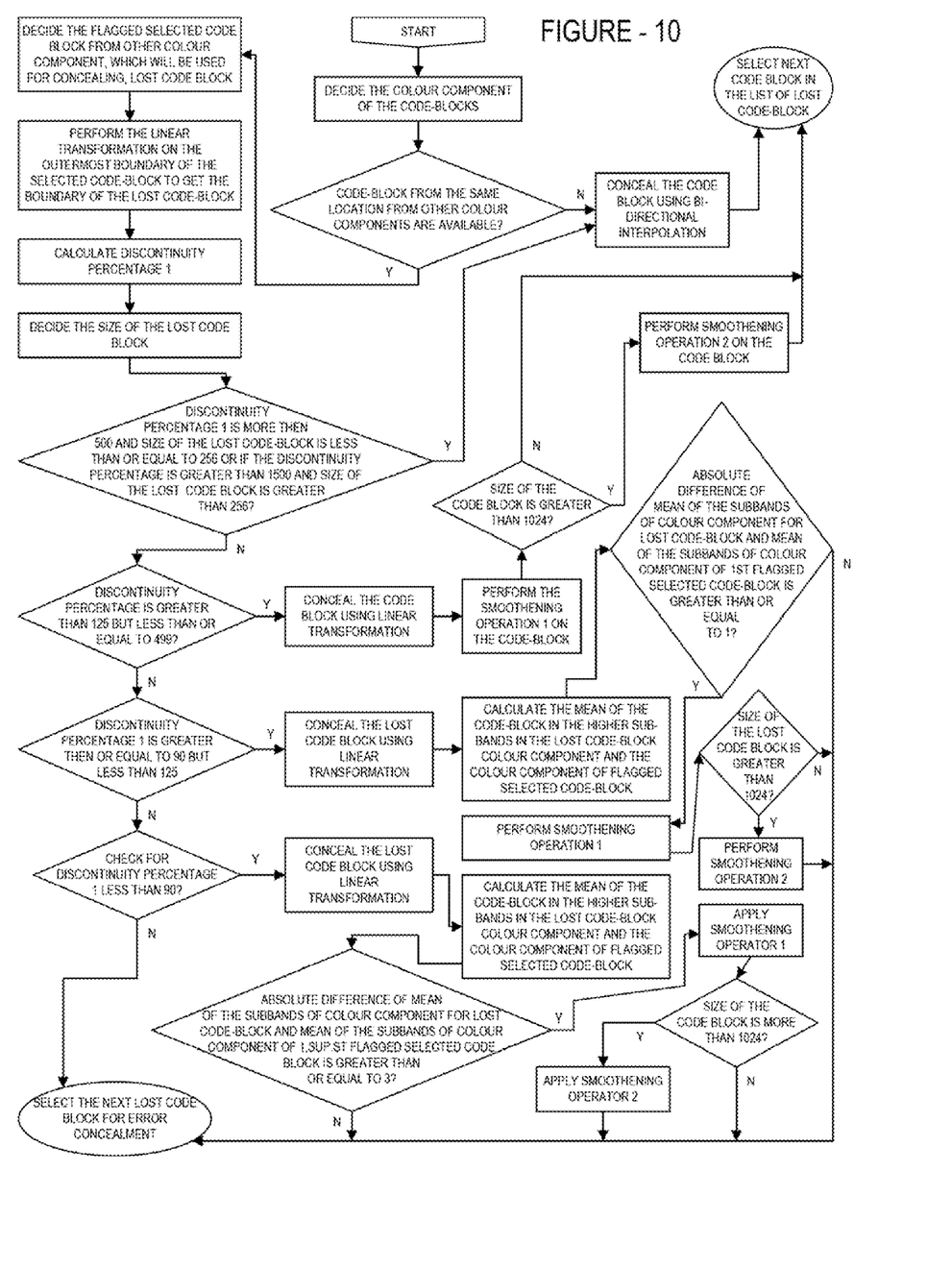

FIG. 10 is a flow Chart for concealing code-block from RGB image. This figure lists the steps needed for concealing the lost code block in RGB space. Start the process for concealing code-block in RGB colour space [10-1]. First decide the colour component of the code-blocks [10-2]. Then determine if the code-block from the same location from other colour components are available [10-3]. If no code-blocks are available from other colour components then conceal the code block using bi-directional interpolation [10-4]. And go for next code block in the list of lost code-block [10-5]. If the code-blocks from the same location from other colour components are available [10-3], then decide the flagged selected code block from other colour component, which will be used for concealing, lost code block [10-6]. Perform the linear transformation on the outermost boundary of the selected code-block to get the boundary of the lost code-block [10-7].

Calculate discontinuity percentage 1 [10-8]. Decide the size of the lost code block [10-9]. If the discontinuity percentage 1 is more then 500 and size of the lost code-block is less than or equal to 256 or if the discontinuity percentage is greater than 1500 and size of the lost code block is greater than 256 in [10-11] are satisfied then conceal the lost code block using bi-linear transformation [10-4]. If the conditions in [10-11] are not satisfied then check if discontinuity percentage is greater than 125 but less than or equal to 499 in [10-12]. If these conditions in [10-12] are satisfied then conceal the code block using linear transformation [10-13]. Then perform the smoothening operation 1 on the code-block [10-14]. If check if the size of the code block is greater than 1024 in [10-15]. If this condition is satisfied then perform smoothening operation 2 on the code block [10-16]. If the condition in [10-15] is not satisfied then do not perform smoothening operation 2. After this step select the next lost code block [10-5]. If the condition in [10-12] are not satisfied then check if discontinuity percentage 1 is greater then or equal to 90 but less than 125 in [10-17]. If these conditions are satisfied then conceal the lost code block using linear transformation [10-18]. Then calculate the mean of the code-block in the higher sub-bands in the lost code-block colour component and the colour component of flagged selected code-block [10-19]. If the absolute difference of mean of the subbands of colour component for lost code-block and mean of the subbands of colour component of $1^{st}$ flagged selected code-block is greater than or equal to 1 in [10-20] is satisfied then perform smoothening operation 1 [10-21]. If the size of the lost code block is greater than 1024 in [10-22] is satisfied then perform smoothening operation 2 [10-23]. If the condition in [10-20] is not satisfied then select the next lost code block for error concealment [10-31]. If the conditions in [10-17] are not satisfied then check for discontinuity percentage 1 less than 90 in [10-24]. If these conditions are satisfied conceal the lost code block using linear transformation [10-25]. Calculate the mean of the code-block in the higher sub-bands in the lost code-block colour component and the colour component of flagged selected code-block [10-26]. Check if the absolute difference of mean of the subbands of colour component for lost code-block and mean of the subbands of colour component of $1^{st}$ flagged selected code block is greater than or equal to 3 in [10-27]. If this condition is satisfied then apply smoothening operator 1 [10-28]. Check if the size of the code block is more than 1024 in [10-29]. If this condition is satisfied then apply smoothening operator 2 [10-30]. After this selected the next lost code-block from the list [10-31].

Figure 11:
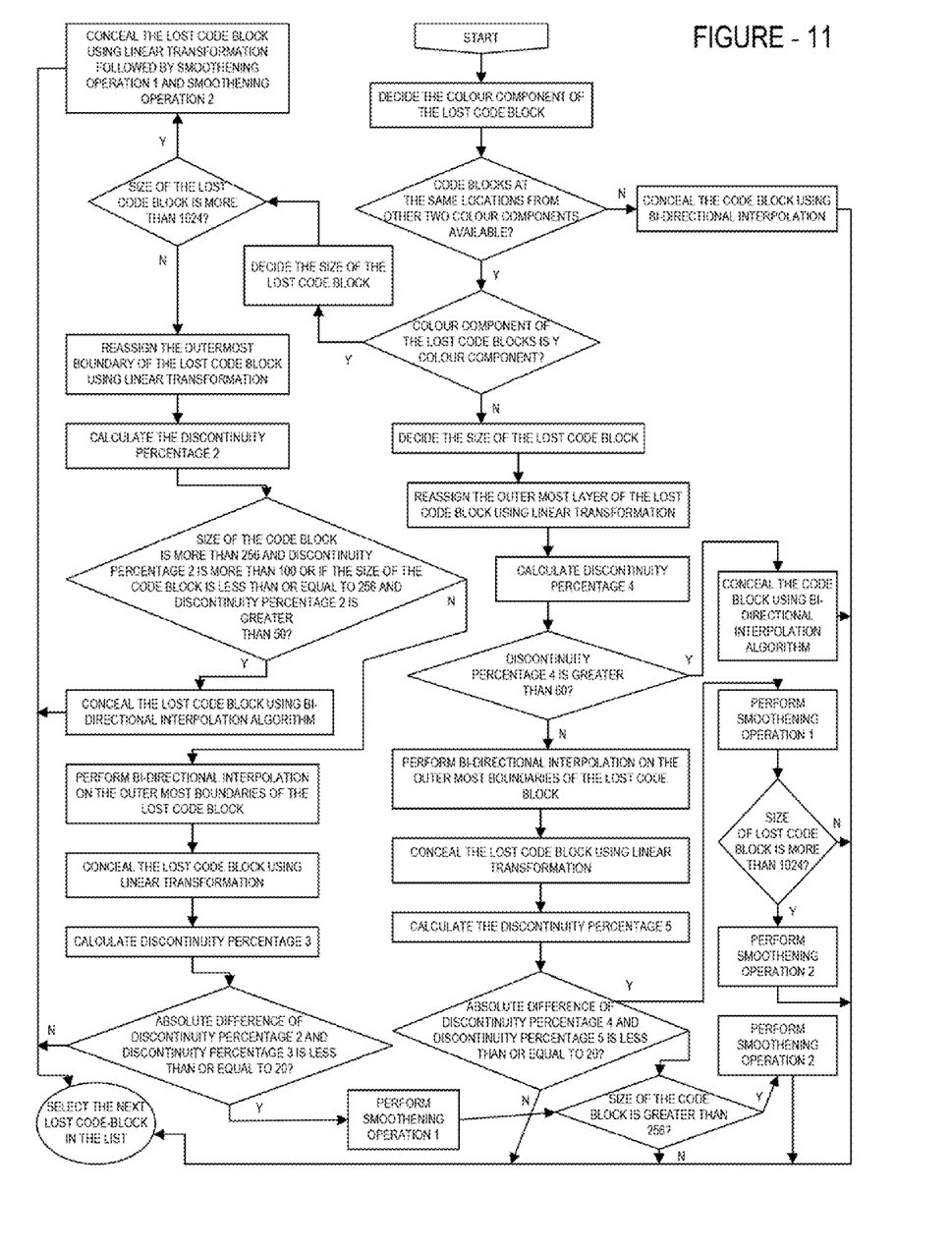
FIG. 11. Flow Chart for concealing code-block from YUV image in accordance with this invention This figure explains the flow chart in details for YUV image.

FIG. 11 is a flow Chart for concealing code-block from YUV image. This figure shows the steps involved in concealing the code-block in YUV colour space. Start the execution of the algorithm for YUV images [11-1]. Decide the colour component of the lost code block [11-2]. Then decide if the code blocks at the same locations from other two colour components are available [11-3]. If the co-cited code block in any of the other colour component is not available then conceal the code block using bi-directional interpolation [11-4]. Then select the next lost code-block in the list [11-32]. If the code block from other colour component is available then decide if the colour component of the lost code blocks is Y colour component [11-5]. If the lost code block is from Y colour component then decide the size of the lost code block [11-6]. Check if the size of the lost code block is more than 1024 in [11-7]. If this condition is satisfied then conceal the lost code block using linear transformation followed by smoothening operation 1 and smoothening operation 2 [11-8] and then proceed for next lost code block in the list [11-32]. If the condition in [11-7] is not satisfied then reassign the outermost boundary of the lost code block using linear transformation [11-9]. Calculate the discontinuity percentage 2 [11-10]. Check if size of the code block is more than 256 and discontinuity percentage 2 is more than 100 or if the size of the code block is less than or equal to 256 and discontinuity percentage 2 is greater than 50 in [11-11] are satisfied then conceal the lost code block using bi-directional interpolation algorithm [11-12] and then proceed for next lost code-block [11-31]. If the conditions in [11-11] are not satisfied then perform bi-directional interpolation on the outer most boundaries of the lost code block [11-13]. Conceal the lost code block using linear transformation [11-14]. Calculate discontinuity percentage 3 [11-15]. Check if absolute difference of discontinuity percentage 2 and discontinuity percentage 3 is less than or equal to 20 in [11-16] is satisfied then perform smoothening operation 1 [11-17]. Check if size of the code block is greater than 256 in [11-18] is satisfied then perform smoothening operation 2 [11-19]. If the condition in [11-18] is not satisfied then proceed for next lost code block in the list [11-32]. If the condition in [11-16] is not satisfied then proceed for next lost code block in the list [11-32]. If the colour component of the lost code block is not Y colour component in [11-5] then decide the size of the lost code block [11-20]. Reassign the outer most layer of the lost code block using linear transformation [11-21]. Calculate discontinuity percentage 4 [11-22]. Check if discontinuity percentage 4 is greater than 60 in [11-23]. If this condition is satisfied then conceal the code block using bi-directional interpolation algorithm [11-24] and proceed to the next lost code block in the list [11-32]. If the condition in [11-23] is not satisfied then perform bi-directional interpolation on the outer most boundaries of the lost code block [11-25]. Conceal the lost code block using linear transformation [11-26]. Calculate the discontinuity percentage 5 [11-27]. Check if absolute difference of discontinuity percentage 4 and discontinuity percentage 5 is less than or equal to 20 in [11-28] is not satisfied then proceed to the next lost code block in the list [11-32]. If the condition in [11-28] is satisfied then perform smoothening operation 1 [11-29]. Check if size of lost code block is more than 1024 in [11-30]. If this condition is satisfied then perform smoothening operation 2 [11-31] and then proceed for next lost code block in the list [11-32]. If the condition in [11-30] is not satisfied then don't perform smoothening operation 2 but continue to next lost code-block in the list [11-32].

Figure 12A:
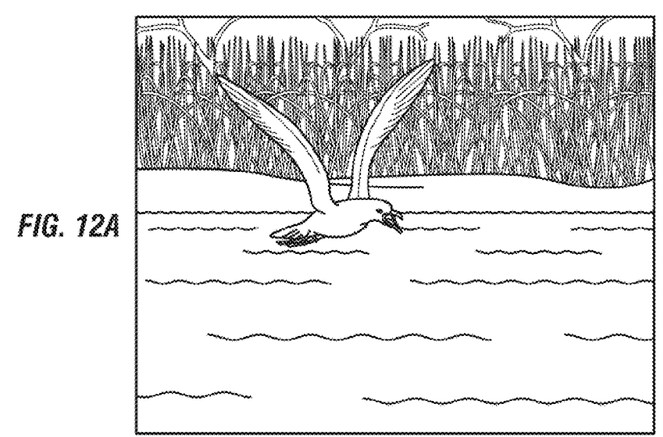
Figure 12B:
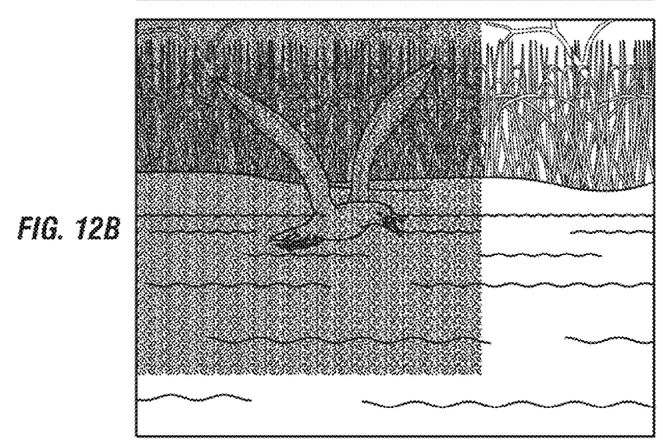
Figure 12C:
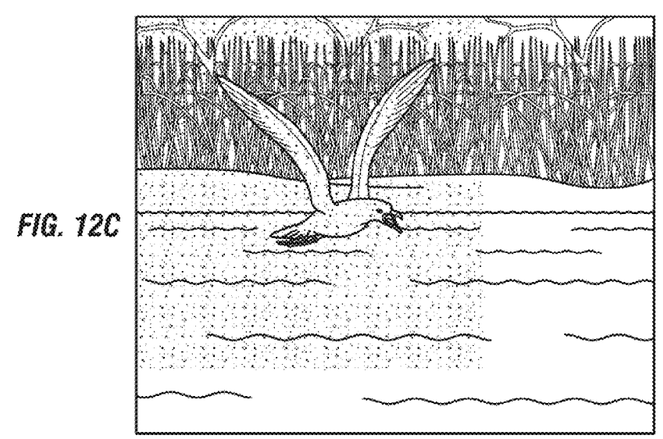

FIGS. 12(a), 12(b) and 12(c) show some of the results of the invention after applying the concealment method where FIG. 12[a] is the original picture, FIG. 12[b] is the picture transmitted with error and FIG. 12[c] is the picture after concealment of the error in the transmitted image of FIG. 12[b].

Figure 13A:
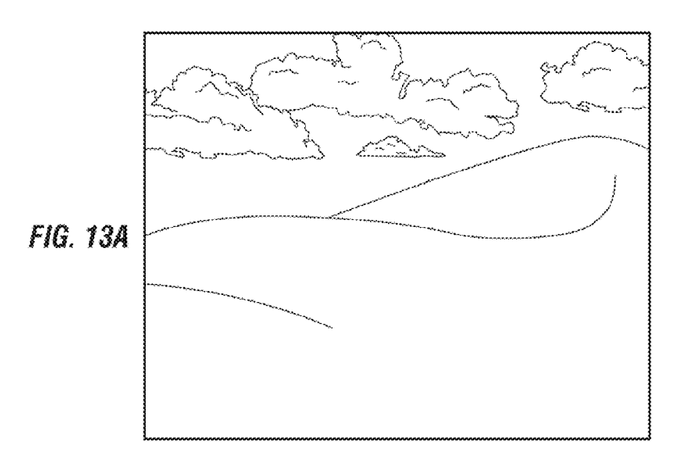
Figure 13B:
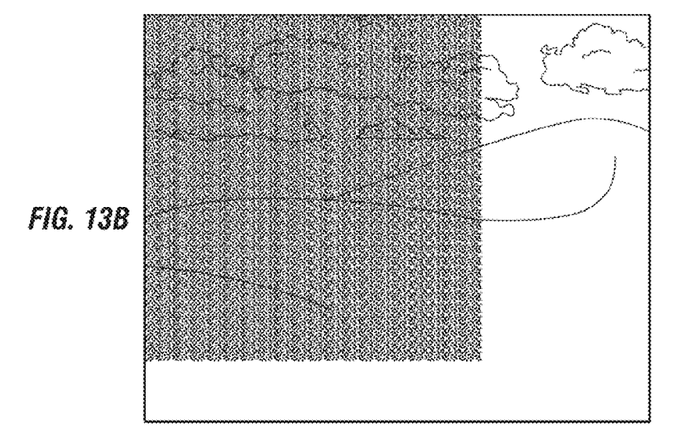
Figure 13C:
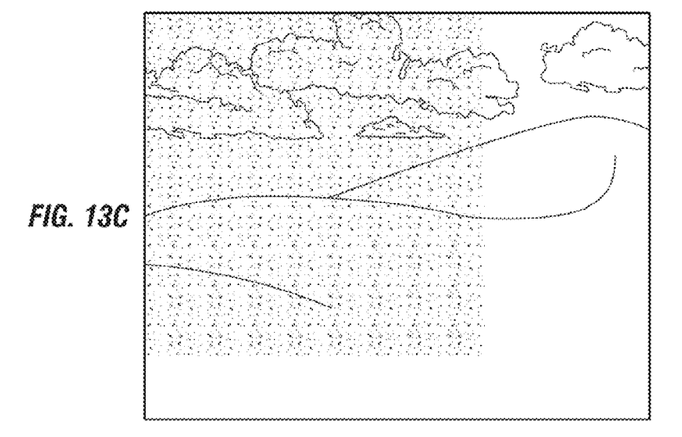

FIGS. 13(a), 13(b) and 13(c) show some of the results of the invention after applying the concealment method where FIG. 13[a] is the original picture, FIG. 13[b] is the picture transmitted with error and FIG. 13[c] is the picture after concealment of the error in the transmitted image of FIG. 13[b].

Figure 14A:
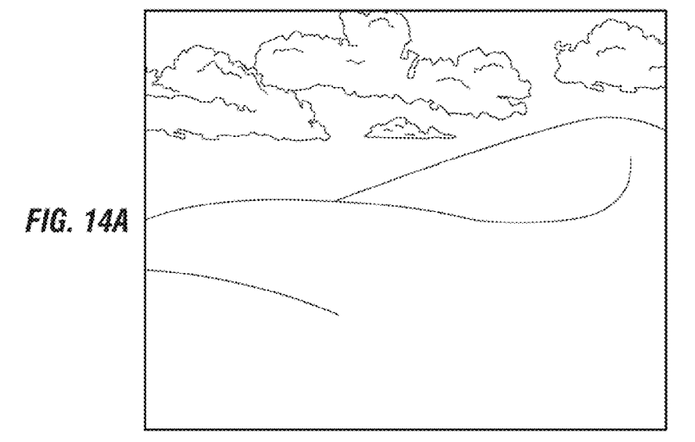
Figure 14B:
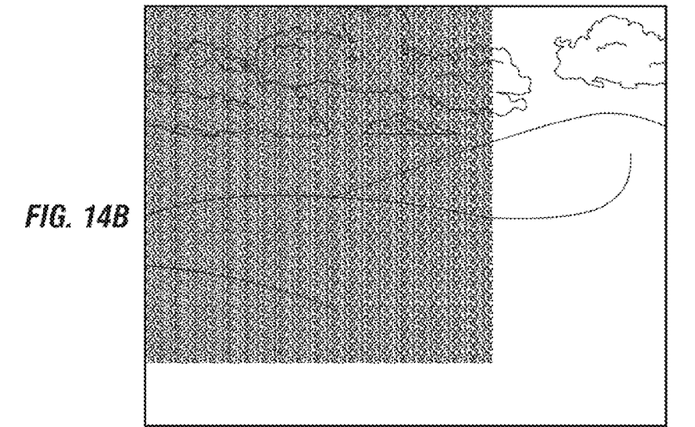
Figure 14C:
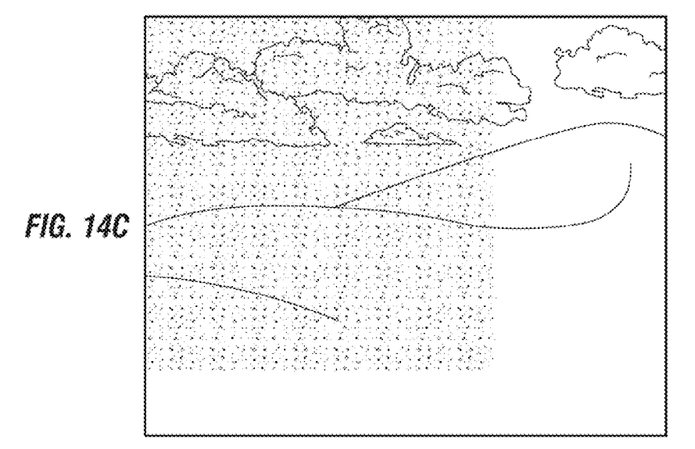

FIGS. 14(a), 14(b) and 14(c) show some of the results of the invention after applying the concealment method where FIG. 14[a] is the original picture, FIG. 14[b] is the picture transmitted with error and FIG. 14[c] is the picture after concealment of the error in the transmitted image of FIG. 14[b].

The invention claimed is:

1. A method, comprising:
    receiving an image;
    decoding the image into a plurality of code blocks;
    determining color components associated with the code blocks;
    extracting a width and a height of a lost code block and determining a size Nc1 by the formula: Nc1= (width*height) of the lost code block in square pixels; and
    concealing an error associated with the image utilizing information obtained via correlation of the color components;
    wherein bi-directional interpolation is used for the concealing of the error based on the determined size Nc1.

2. The method of claim 1, wherein the information includes coefficients.

3. The method of claim 1, wherein the information includes coefficient values.

4. The method of claim 1, wherein the information includes a size of at least one of the code blocks.

5. The method of claim 1, wherein the error is associated with a first code block, and the information is obtained from a second code block.

6. The method of claim 1, wherein a percentage of discontinuity is calculated between reassigned values of pixels in an outermost boundary of a lost code block and values of pixels in an outermost boundary of a correctly decoded code block.

7. The method of claim 6, wherein the correctly decoded code block shares a common boundary with the lost code block.

8. The method of claim 6, wherein the percentage is utilized in the concealing of the error.

9. A system, comprising:
    logic for receiving an image;
    logic for decoding the image into a plurality of code blocks;
    logic for determining color components associated with the code blocks;
    logic for extracting a width and a height of a lost code block and determining a size Nc1 by the formula: Nc1= (width*height) of the lost code block in square pixels; and
    logic for concealing an error associated with the image utilizing information obtained via correlation of the color components;
    wherein the system is operable such that bi-directional interpolation is used for the concealing of the error based on the determined size Nc1.

10. The system of claim 9, wherein the information includes coefficients.

11. The system of claim 9, wherein the information includes coefficient values.

12. The system of claim 9, wherein the information includes a size of at least one of the code blocks.

13. The system of claim 9, wherein the error is associated with a first code block, and the information is obtained from a second code block.

14. The system of claim 9, wherein a percentage of discontinuity is calculated between reassigned values of pixels in an outermost boundary of a lost code block and values of pixels in an outermost boundary of a correctly decoded code block.

15. The system of claim 14, wherein the correctly decoded code block shares a common boundary with the lost code block.

16. The system of claim 14, wherein the percentage is utilized in the concealing of the error.

* * * * *